US011256713B2

(12) United States Patent
Seelemann, II et al.

(10) Patent No.: US 11,256,713 B2
(45) Date of Patent: Feb. 22, 2022

(54) VIRTUAL TRANSACTION QUEUES FOR DATABASE REPLICATION

(71) Applicant: International Business Machines Corporation, Armonk, NY (US)

(72) Inventors: Dirk Alexander Seelemann, II, Ontario (CA); Dzmitry Lepniakou, Toronto (CA); Michael Jory, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 16/858,967

(22) Filed: Apr. 27, 2020

(65) Prior Publication Data
US 2021/0334246 A1    Oct. 28, 2021

(51) Int. Cl.
*G06F 16/27*    (2019.01)
*G06F 16/22*    (2019.01)
*G06F 16/23*    (2019.01)

(52) U.S. Cl.
CPC .......... *G06F 16/27* (2019.01); *G06F 16/2282* (2019.01); *G06F 16/2358* (2019.01)

(58) Field of Classification Search
CPC ... G06F 16/27; G06F 16/2282; G06F 16/2358
USPC ........................................................ 707/703
See application file for complete search history.

(56) References Cited

U.S. PATENT DOCUMENTS

| 5,553,279 | A | * | 9/1996 | Goldring | G06F 11/1471 |
| | | | | | 707/615 |
| 7,904,434 | B2 | * | 3/2011 | Yalamanchi | G06F 16/2336 |
| | | | | | 707/703 |
| 8,301,593 | B2 | * | 10/2012 | Hoffmann | G06F 11/2097 |
| | | | | | 707/615 |
| 8,341,125 | B2 | | 12/2012 | Mitchell et al. | |
| 8,392,387 | B2 | | 3/2013 | Bourbonnais et al. | |
| 8,566,296 | B2 | * | 10/2013 | Yalamanchi | G06F 16/2329 |
| | | | | | 707/703 |
| 8,996,458 | B2 | * | 3/2015 | Shang | G06F 16/27 |
| | | | | | 707/615 |
| 9,286,346 | B2 | * | 3/2016 | Pruet, III | G06F 16/24565 |
| 9,904,721 | B1 | * | 2/2018 | Holenstein | G06F 16/273 |
| 10,078,650 | B2 | * | 9/2018 | Dole | G06F 16/273 |
| 10,216,584 | B2 | | 2/2019 | Bourbonnais et al. | |

(Continued)

Primary Examiner — Phuong Thao Cao
(74) Attorney, Agent, or Firm — Garg Law Firm, PLLC; Rakesh Garg; William Hartwell

(57) ABSTRACT

An embodiment includes extracting, after a first specified time interval, recovery data from a recovery log for a data table corresponding to a set of database operations on the data table that occurred during the first specified time interval. The embodiment also generates index data for a progress record associated with the first time interval. The progress record includes a first data field for storing data representative of a first net change to the data table resulting from a first subset of the set of database operations. The first subset of database operations are associated with a first transaction. The embodiment also detects a commit operation in the first subset of database operations that committed the first transaction. The embodiment also recovers the first transaction in a target data table using the recovery log and the first net change data associated with the first transaction in the progress record.

20 Claims, 8 Drawing Sheets

(56) References Cited

U.S. PATENT DOCUMENTS

| | | | | |
|---|---|---|---|---|
| 10,303,701 | B1* | 5/2019 | Jang | G06F 16/215 |
| 2002/0165724 | A1* | 11/2002 | Blankesteijn | G06F 16/2308 |
| | | | | 705/1.1 |
| 2005/0193041 | A1* | 9/2005 | Bourbonnais | G06F 16/273 |
| 2007/0100912 | A1* | 5/2007 | Pareek | G06F 11/1466 |
| 2008/0163222 | A1* | 7/2008 | Bourbonnais | G06F 16/23 |
| | | | | 718/101 |
| 2009/0313311 | A1* | 12/2009 | Hoffmann | G06F 11/2097 |
| 2011/0153568 | A1* | 6/2011 | Shang | G06F 16/27 |
| | | | | 707/648 |
| 2012/0101990 | A1* | 4/2012 | Holenstein | G06Q 10/087 |
| | | | | 707/615 |
| 2012/0109895 | A1 | 5/2012 | Zwilling et al. | |
| 2012/0150829 | A1* | 6/2012 | Bourbonnais | G06F 16/273 |
| | | | | 707/703 |
| 2015/0032695 | A1* | 1/2015 | Tran | G06F 16/273 |
| | | | | 707/625 |
| 2015/0347551 | A1* | 12/2015 | Shang | G06F 16/273 |
| | | | | 707/615 |
| 2016/0110439 | A1* | 4/2016 | Hrle | G06F 16/273 |
| | | | | 707/600 |
| 2018/0046643 | A1* | 2/2018 | Brodt | G06F 16/2457 |
| 2018/0095841 | A1* | 4/2018 | Kedia | G06F 11/1474 |
| 2019/0138644 | A1* | 5/2019 | Kedia | G06F 16/2358 |
| 2020/0320059 | A1* | 10/2020 | Kumar | G06F 16/2358 |
| 2021/0135932 | A1* | 5/2021 | Motylinski | G06Q 20/00 |

* cited by examiner

VIRTUAL TRANSACTION QUEUES FOR DATABASE REPLICATION

BACKGROUND

The present invention relates generally to a method, system, and computer program product for database replication. More particularly, the present invention relates to a method, system, and computer program product for virtual transaction queues for database replication.

Relational database management systems (RDBMSs) are frequently used by application programmers to manage data. An RDBMS provides an interface that allows a user to do such things as create, retrieve, update, and delete data in a database. A common feature of many RDBMSs is a roll-forward recovery log. The recovery log is a data container that can be used to fix a database in the event of an error or other such problem that would otherwise cause a database failure.

Databases are commonly configured to have atomicity, consistency, isolation, and durability or "ACID" in order to be recoverable using a recovery log. Atomicity refers to grouping related operations into transactions that are treated as a single operation unit that requires the grouped operations to either all succeed or fail together if even a single operation fails. Consistency only allows transactions and data that result in a valid state. Isolation requires the result of concurrent transactions to be the same as if those transactions were executed sequentially. Durability requires committed transactions to remain committed, even in the event of a system failure.

There are many different RDBMSs available, and while most are compatible with a wide range of databases, the RDBMSs differ somewhat from each other. One significant difference between different RDBMSs involves variations in support and implementation of data types. When an RDBMS creates a table or adds a field to a table in a database, fields are created as specific data types. RDBMSs use data types as classifications that identify possible values for the data and identify operations that can be done on the data. They also specify the way the RDBMS stores the data in that field in the database. Because of these variations in data types, it is a non-trivial task to copy data from one type of DBMS to another.

Database replication (or data replication) involves the heterogeneous copying of data between disparate kinds RDBMSs. Database replication can include copying many common database objects, such as tables, indices, triggers, views, and functions. Data replication can also involve making a complete copy or a less than complete copy of data in a database. For example, a complete replica can provide for improved availability in case of a failure, and can provide improved response times when server load is shared among the original and replica databases. A partial replica can allow for geographically distributed replicas that are locally customized according to local configurations.

SUMMARY

The illustrative embodiments provide for virtual transaction queues for database replication. An embodiment includes extracting, at the end of a first specified time interval, recovery data from a recovery log for a data table corresponding to a set of database operations on the data table that occurred during the first specified time interval. The embodiment also includes generating, responsive to extracting the recovery data at the end of the first specified time interval, index data for a progress record associated with the first time interval, wherein the progress record includes a first data field for storing data representative of a first net change to the data table resulting from a first subset of the set of database operations, wherein the first subset of database operations are associated with a first transaction. The embodiment also includes detecting, responsive to generating the index data, a commit operation in the first subset of database operations that committed the first transaction. The embodiment also includes recovering, responsive to detecting the commit operation, the first transaction in a target data table using the recovery log and the first net change data associated with the first transaction in the progress record. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
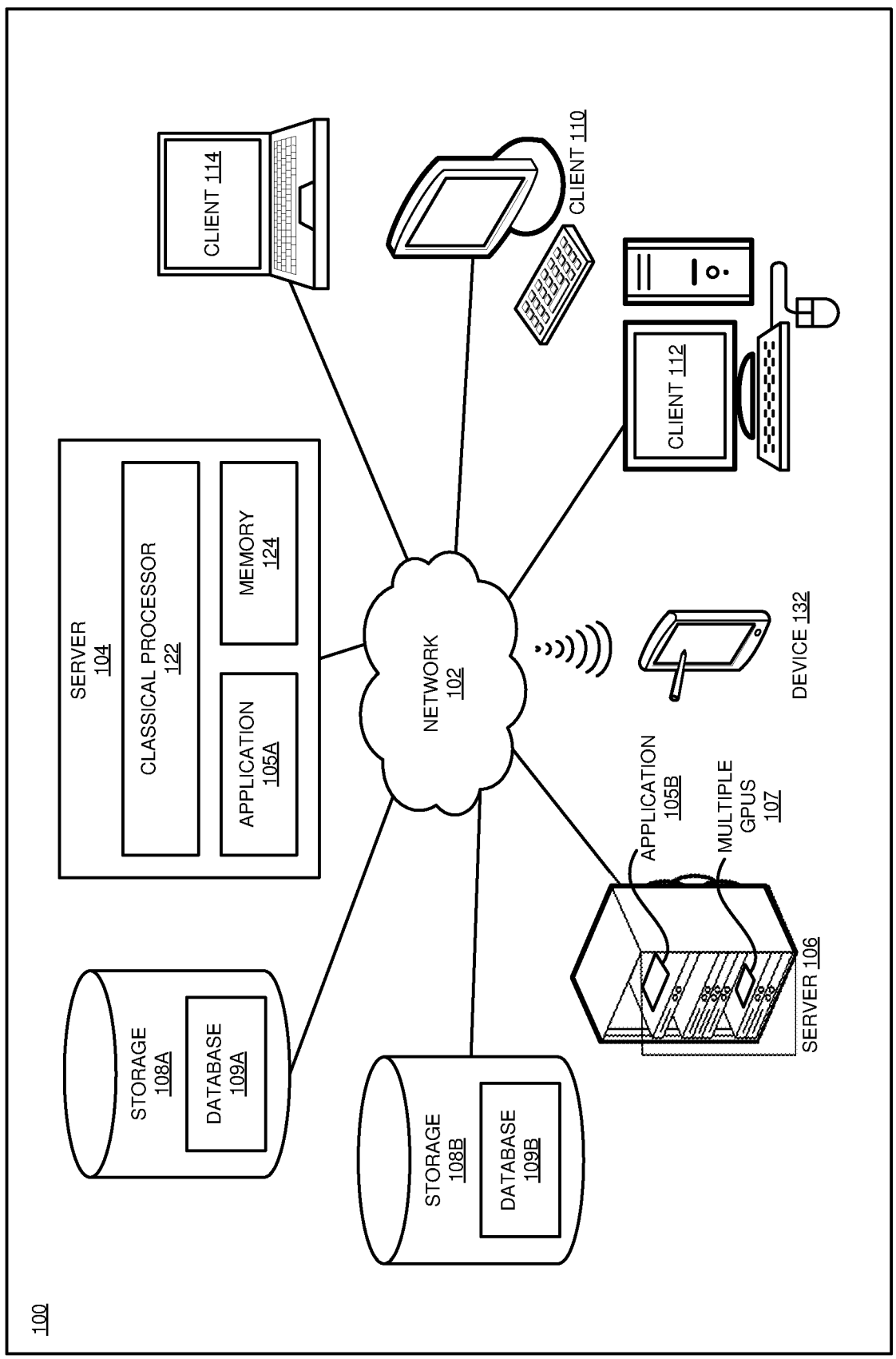
FIG. 1 depicts a block diagram of a network of data processing systems in which illustrative embodiments may be implemented.

In fields related to database technology, the demand for data replication arises in scenarios that involve data that is in demand in geographically distant locations or where database performance and availability improvements are desired. In the past, the lack of network bandwidth and high cost of improving bandwidth provided motivation for database replication in geographically distant locations to allow the data to be closer to globally distributed users. More recently, as global networking has improved, the bottleneck for database performance has moved closer to the databases, RDBMSs and operating systems. However, replication continues to become increasingly desirable. For example, data replication allows for load sharing with replicas, which can provide gains in performance, response times, and throughput.

Sometimes data replication involves moving data from a source database while the source database is at runtime and subject to ongoing changes. In this situation, the source database may have one or more independent connections that allow for concurrent changes to the database. At any given time, one or more of these connections may have a respective open transaction containing one or more changes that have been made on the connection since it last committed or rolled back. The database also writes a copy of each of these uncommitted changes to a database log. The replication process "scrapes" or extracts every one of the uncommitted changes from the database log and writes a copy of each of the changes to respective transaction queues.

In some implementations, the replication system does not send changes to the target database that have not been committed. Thus, for this technique, uncommitted changes accumulate on one or more respective transaction queues until the replication system detects a commit or rollback for one of the transactions. If a transaction is rolled back, the changes are removed from the respective transaction queue and are therefore never sent to the target database. On the other hand, if a transaction is committed, the replication system serially sends all of the changes for that transaction that have accumulated in the respective transaction queue via a replication stream in the same order they were made to the source database.

While replication systems that operate as described above provide effective replication of changing data from a source to a target database, the embodiments disclosed herein recognize that such replication processes involve making several copies of every change. Such replication processes write a copy of every change to the database log, to a transaction queue, and if the transaction is committed, to the target database as well. These multiple copies of all of the changes consume memory and translate to IO costs.

Therefore, embodiments disclosed herein store the net effect of transactions in progress records that serve as a virtual transaction queue rather than copying every operation or change into actual transaction queues. Thus, embodiments disclosed herein improve upon prior replication processes and systems by employing progress records as virtual transaction queues that only store the net effect of a transaction rather than storing every change, thereby reducing the memory and IO cost of a replication system by orders of magnitude. This enormous reduction in memory and IO costs translates to significant improvements to database systems, servers, or other associated hardware that can perform a given replication relatively faster using relatively fewer system resources by orders of magnitude.

According to some embodiments, a data replication application that employs progress records as virtual transaction queues extracts, at the end of a first specified time interval, recovery data from a recovery log for a source database. The extracted recovery data corresponds to a set of database operations on the database that occurred during the first specified time interval.

According to some embodiments, a data replication application that employs progress records as virtual transaction queues generates index data for a progress record after each time interval. For example, in some embodiments, the data replication application generates index data for a first progress record associated with a first time interval, wherein the first progress record includes data fields for storing net changes resulting from database operations associated with respective transactions. Thus, a first data field stores a first net change resulting from database operations associated with a first transaction, a second data field stores a second net change resulting from database operations associated with a second transaction, and so on for each transaction in progress during the specified time interval.

According to some embodiments, a data replication application detects certain operations during the specified time interval, or lack thereof, that terminate each transaction. For example, in some embodiments, the data replication application detects a commit operation in the database operations that committed the first transaction. Alternatively, in some embodiments, the data replication application detects a rollback operation in the database operations that aborted the first transaction. In either case, the data replication application takes action to prevent further searching for operations associated with such transactions that have terminated by commit, abort, or otherwise.

According to some embodiments, especially to simplify recovery log management, when replicating across geographic distance or over constrained network bandwidth, might duplicate the recovery log contents at a distance and operate on the copy. Some embodiments, especially when replicating across geographic distance or over constrained network bandwidth, might briefly buffer the recovery log contents in memory to reduce the IO cost of the copy.

According to some embodiments, a data replication application detects a commit operation in the database operations that committed the first transaction and, in response, recovers the first transaction in a target database. In some embodiments, the data replication application uses the recovery log and the first net change data associated with the first transaction in the progress record to recover the first transaction. It should be noted that this allows replication without the need for the actual transaction queues, and thereby saves IO cost and memory cost compared to prior replication techniques.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
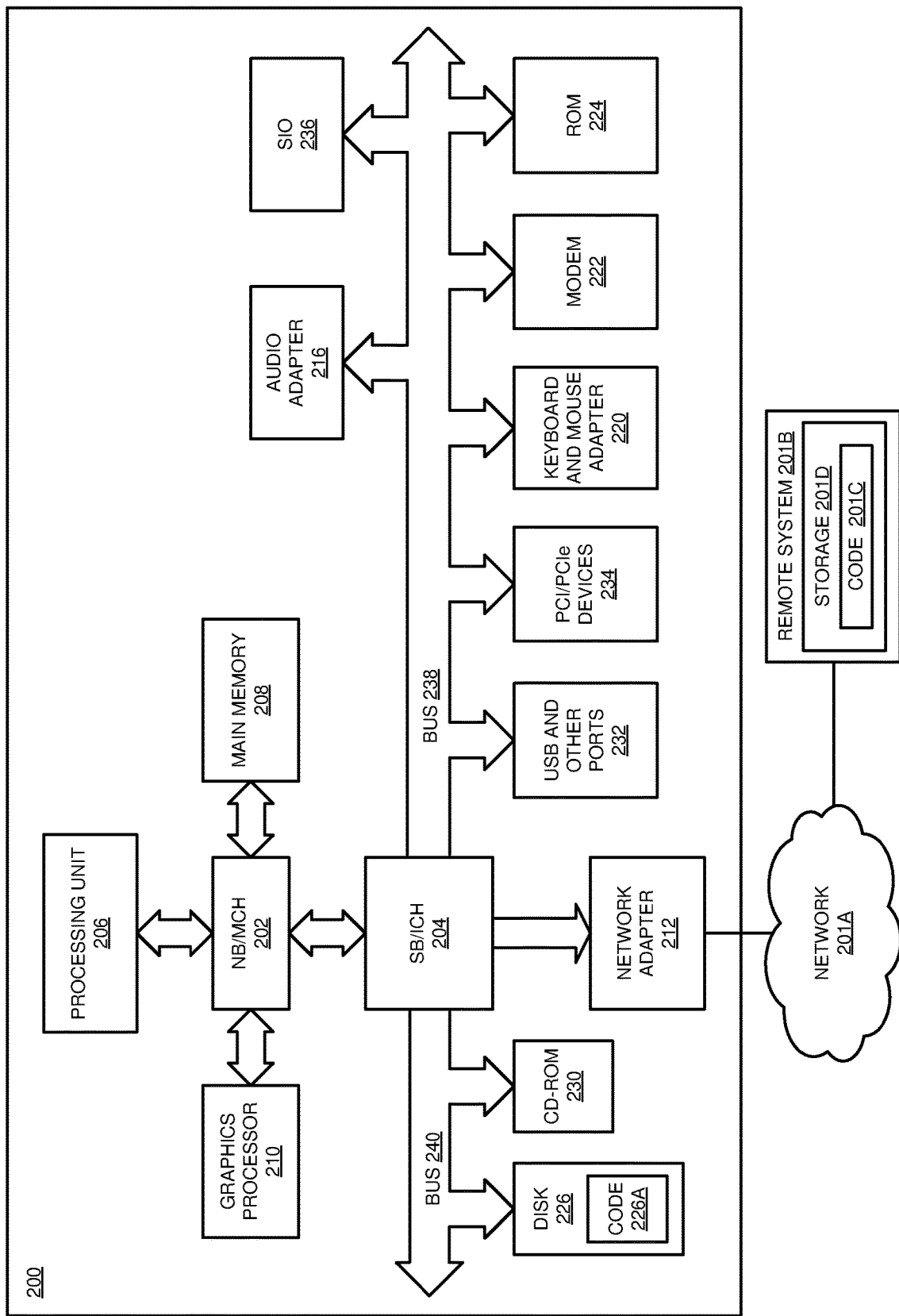
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 is a data processing system and couples to network 102 and storage unit 108A. Storage unit 108A includes a database 109A configured to store data as described herein with respect to various embodiments, for example image data and attribute data. Software applications may execute on any data processing system in data processing environment 100. Any software application described as executing in server 104 in FIG. 1 can be configured to execute in another data processing system in a similar manner. Any data or information stored or produced in server 104 in FIG. 1 can be configured to be stored or produced in another data processing system in a similar manner. A data processing system, such as server 104, may contain data and may have software applications or software tools executing computing processes thereon. In an embodiment, server 104 includes memory 124, which includes application 105A that may be configured to implement one or more of the data processor functions described herein in accordance with one or more embodiments.

Server 106 couples to network 102 along with storage unit 108B. Storage unit 108B includes a database 109B configured to store data as described herein with respect to various embodiments, for example image data and attribute data. Server 106 is a data processing system. In an embodiment, server 106 includes an application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Servers 104, 106, storage units 108A, 108B, and clients 110, 112, and 114, and device 132 may couple to network 102 using wired connections, wireless communication protocols, or other suitable data connectivity. Clients 110, 112, and 114 may be, for example, personal computers or network computers.

In the depicted example, servers 104, 106 may provide data, such as boot files, operating system images, and applications to clients 110, 112, and 114. Clients 110, 112, and 114 may be clients to servers 104, 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as server 104, 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200

Figure 3:
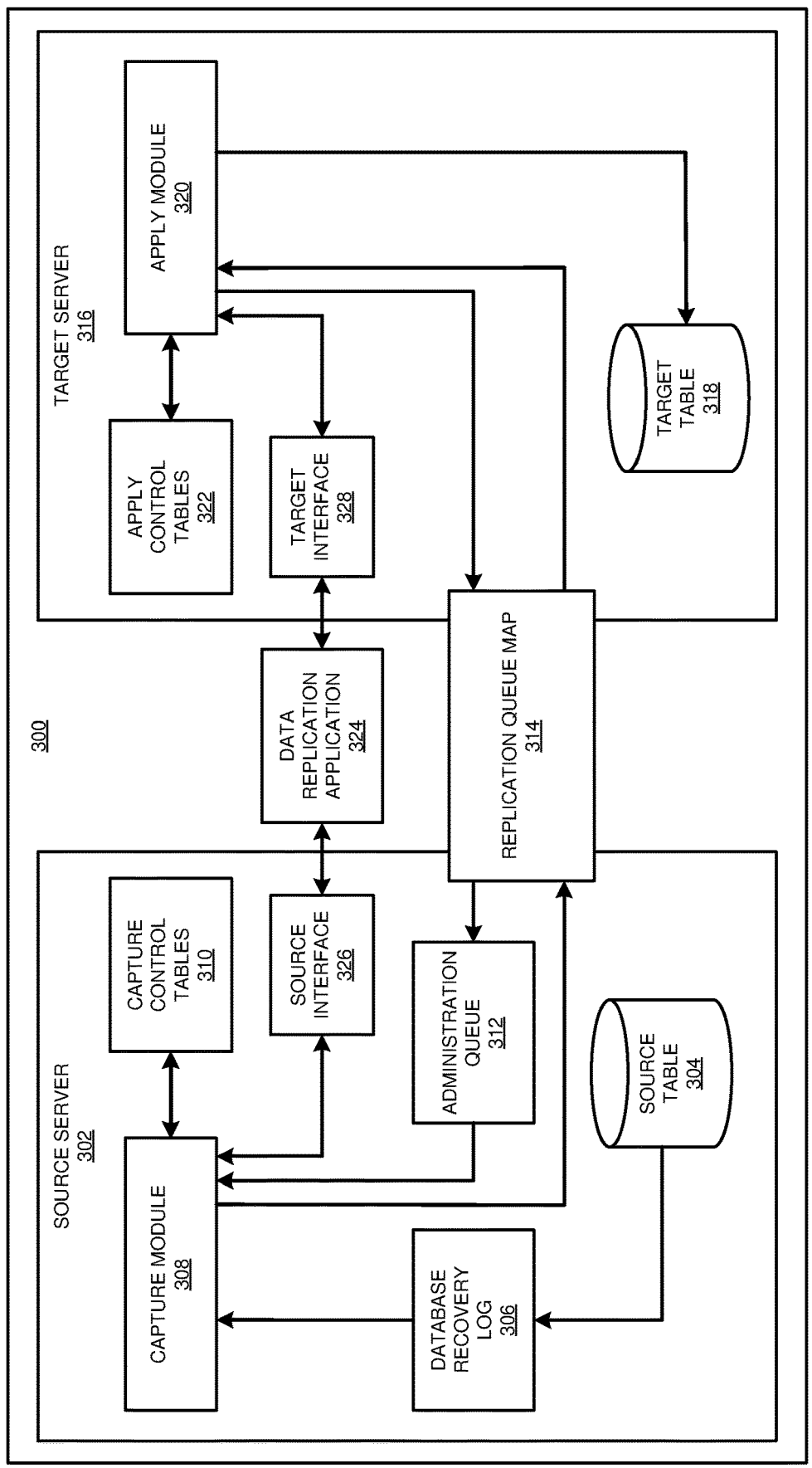
FIG. 3 depicts a block diagram of an example configuration for performing a data replication process in accordance with an illustrative embodiment.

With reference to FIG. 3, this figure depicts a block diagram of an example configuration 300 in accordance with an illustrative embodiment. In a particular embodiment, the configuration 300 includes a source server 302 and a target server 316, which are examples of servers 104 and 106 of FIG. 1.

In the illustrated embodiment, the source server 302 includes a source table 304, a database recovery log 306, a capture module 308, one or more capture control tables 310, and an administration queue 312. The illustrated embodiment also includes a replication queue map 314 that maps the source server 302 to the target server 316. The target server 316 includes a target table 318, a apply module 320, and one or more apply control tables 322. The illustrated embodiment also includes a data replication application 324 that is in communication with the source server 302 via a source interface 326 and is in communication with the target server 316 via a target interface 328. In some embodiments, the functionality described herein is distributed among a plurality of systems, which can include combinations of software and/or hardware based systems, for example Application-Specific Integrated Circuits (ASICs), computer programs, or smart phone applications. In some embodiments, the servers 302, 316 operate in a cloud environment, where the source table 304 and the target table 318 are stored in respective clusters of a cloud storage system.

In some embodiments, a replication process is initiated and managed by the data replication application 324, which can operate as discussed in connection with FIG. 4. In some embodiments, the replication process captures changes to the source table 304 and converts committed transactional data to messages that are sent to the target server 316. In some embodiments, data is sent to the target server as soon as the replication process detects that the data has been committed at the source table 304 rather than being staged in tables.

More specifically, in some embodiments, the capture module 308 reads the database recovery log 306 for changed source data in the source table 304 and writes the changes to the replication queue map 314, which converts that data into messages and sends the messages to the target server 316. In some embodiments, the capture module 308 periodically reads database recovery log 306 for committed transactions involving one or more changes to the source table 304. If the capture module 308 reads a committed transaction, it adds the one or more changes of the committed transaction to the replication queue map 314. The changes are then sent to the target server 316, which then applies the transactions to the target table 318.

In some embodiments, the replication queue map 314 is a messaging middleware that uses messages and queues to support exchange of information between the source and target servers 302, 316. In some embodiments, the replication queue map 314 supports one or more communication protocols or APIs, for example Representational state transfer (REST), .NET, MQ Light, and MQTT.

In some embodiments, the capture module 308 uses a set of control tables 310, for example DB2® relational tables used as Capture control tables 310 (DB2 is a registered trademark of International Business Machines Corp.). In some embodiments, the capture control tables 310 contain information about replication sources, the targets that correspond to them, and queues of the queue map 314 that are being used by the capture module 308. In some embodiments, the capture control tables 310 also contain data that is used to check and monitor the performance of capture module 308, such as data about the current position of the capture module 308 in the recovery log 306.

In some embodiments, the apply module 320 uses a set of control tables 322, for example apply control tables 322. In some embodiments, the apply control tables 322 contain information about replication targets, the sources that correspond to them, and queues of the queue map 314 that are being used by the apply module 320. In some embodiments, the apply control tables 322 also contain data that is used to check and monitor the performance of apply module 320.

In some embodiments, the source and target tables 304, 318 include the same or different relational database management systems (RDBMSs). For example, in some embodiments, the source includes a "Brand A" database and the target includes a "Brand B" database, where both databases are offered by the same or different companies, and the two databases may support data types, structures, or commands that are not supported by the other database.

Figure 4:
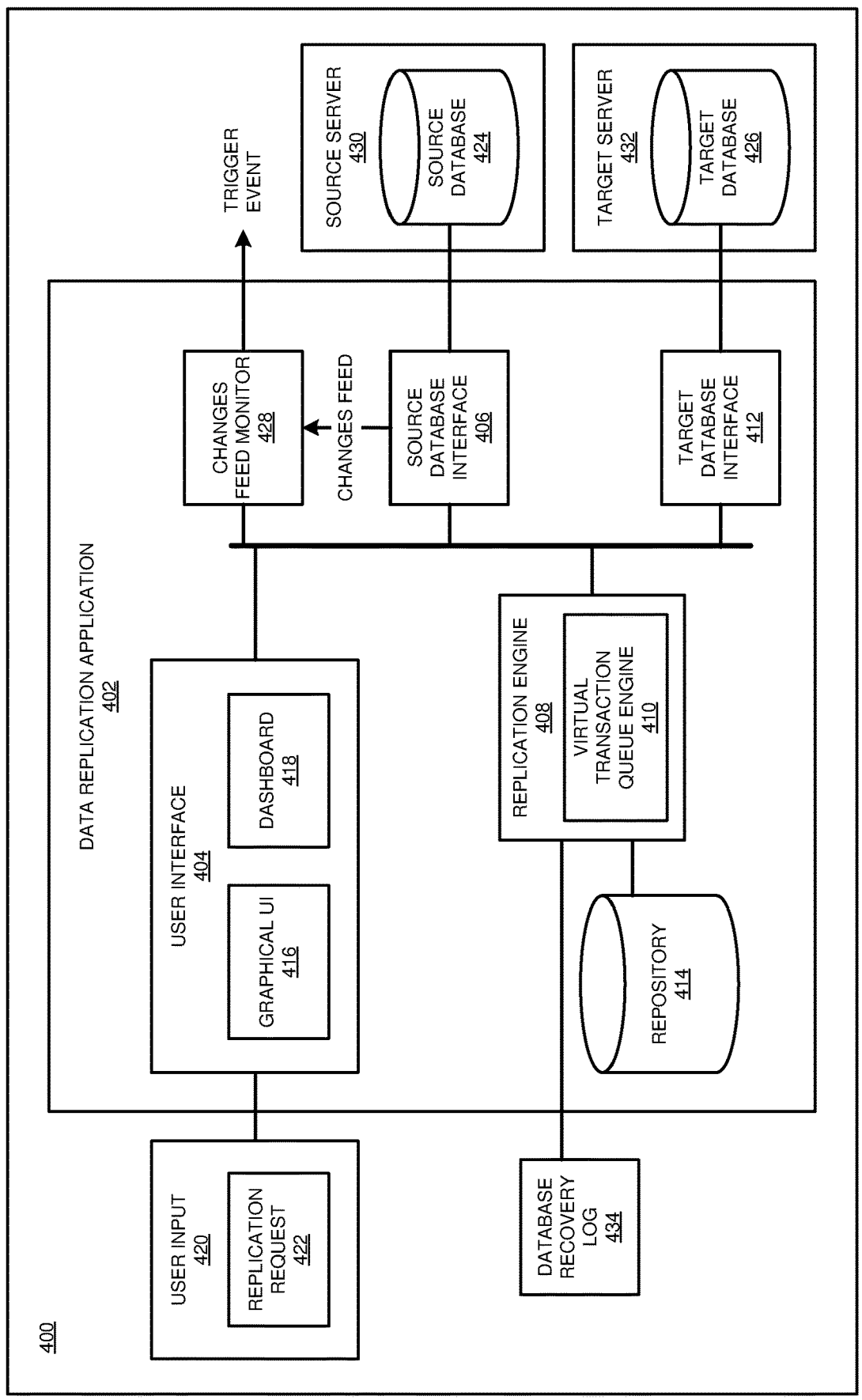
FIG. 4 depicts block diagram of an example configuration of a data replication application in accordance with an illustrative embodiment.

With reference to FIG. 4, this figure depicts a block diagram of an example configuration 400 in accordance with an illustrative embodiment. In a particular embodiment, the configuration 400 includes a data replication application 402, which is an example of the data replication application 324 in FIG. 3. The data replication application 402 is in communication with a source server 430 and a target server 432, which are examples of the source and target servers 302, 316, respectively, in FIG. 3.

In some embodiments, the data replication application 402 includes a user interface 404, a source database interface 406, a replication engine 408, a target database interface 412, a repository 414, and a changes feed monitor 428. In alternative embodiments, the data replication application 402 can be implemented as an automaton that includes some or all of the functionality described herein and grouped the same or grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications. In some embodiments, the data replication application 402 operates in a cloud environment, where the data of the source database 424 is stored in a single cluster of a cloud storage system and the target database 426 is stored in a different single cluster of the cloud storage system.

In some embodiments, the user interface 404 includes a graphical user interface (GUI) 416 and a replication dashboard 418. The GUI 416 allows a user to submit various user inputs 420 to the data replication application 402, including replication requests 422. In some embodiments, the GUI 416 includes form input elements that a user can populate with data that will be submitted as form data to submit replication requests 422. In some embodiments, the GUI 416 allows a user to set configuration parameters for configuration of a source database 424 and a target database 426 associated with the replication request 422. In some embodiments, the GUI 416 allows a user to create the target database 426. In alternative embodiments, the user interface 404 includes a command line interface in place of, or in addition to, the GUI 416.

The replication dashboard 418 allows a user to monitor the data replication process and receive various reports while the replication process is ongoing and/or upon completion of the replication process. In some embodiments, the replication dashboard 418 is a browser-based front end that displays status, alert, and performance information for the replication process. For example, in some embodiments, the replication dashboard 418 provides a graphical display of a summary overview that indicates all send and receive queues that are active. In some embodiments, the replication dashboard 418 monitors the progress of the replication process and updates the information shown on the graphical display in real time or near real time.

In some embodiments, the data replication application 402 generates one or more connections that are used to replicate data between the source database 424 and the target database 426. For example, in some embodiments, the data replication application 402 stores details of respective transactions (e.g., a set of tables and their columns along with other change data capture (CDC) properties such as filter/user exit, expressions, etc.) that are being replicated and details of how the source data is applied to the target database 426. In some such embodiments, the replication dashboard 418 provides a graphical display of information regarding status, alert situations, performance indicators for existing and/or active connections.

In some embodiments, the source database interface 406 communicates with source database 424 on source server 430. In some embodiments, the source database interface 406 locates source data in the source database 424 for replication according to the replication request 422. For example, in some embodiments, the replication request 422 designates some or all of the data of the source database as source data to be replicated. In some embodiments, the source database interface 406 is a DBMS or comprises a DBMS for managing the source data storage 424.

In some embodiments, the target database interface 412 communicates with target data storage 426. In some embodiments, the source database interface 412 writes the replicated source data as target data in the target database 426. In some embodiments, the target database interface 412 is a DBMS or comprises a DBMS for managing the target data storage 426.

In some embodiments, the source database interface 406 publishes a changes feed of messages related to actions associated with the source database 424. In some embodiments, the messages include a list of database commands occurring, for example the adds, edits, and deletes affecting the source data storage 424. For example, in some embodiments, the changes described by the changes feed include:

Data indicative of a data value written to the target database

Data indicative of source data corresponding to the data value written to the target database Data indicative of a unique value associated with the writing of the data value to the target database In some embodiments, a changes feed monitor 428 receives the feed and monitors the messages therein. In some embodiments, the changes feed monitor 428 is configurable by a user or by other elements of the data replication application 402. For example, a user or other element may configure the changes feed monitor 428 to monitor the changes feed for a specified condition specified by the changes feed or derived by the changes feed monitor 428 based at least in part on information provided by the changes feed. In some embodiments, the changes feed monitor 428 automatically triggers an event associated with the specified condition upon detecting that the specified condition has been satisfied. Non-limiting examples of events triggered by the changes feed monitor 428 include sending an email or other type of message that includes an alert or report related to the replication process, updating an in-memory database to record live counts of activity, writing data to a text file to push data into a database.

In some embodiments, the replication engine 408 includes a virtual transaction queue engine 410. In some embodiments, the replication engine 408 uses the virtual transaction queue engine 410 to periodically check the database recovery log 434 for the status of transactions. If the virtual transaction queue engine 410 detects a committed transaction, the replication engine 408 then performs further steps for replicating the changes in the committed transaction at the target database 426 via the target database interface 412.

Figure 5A:
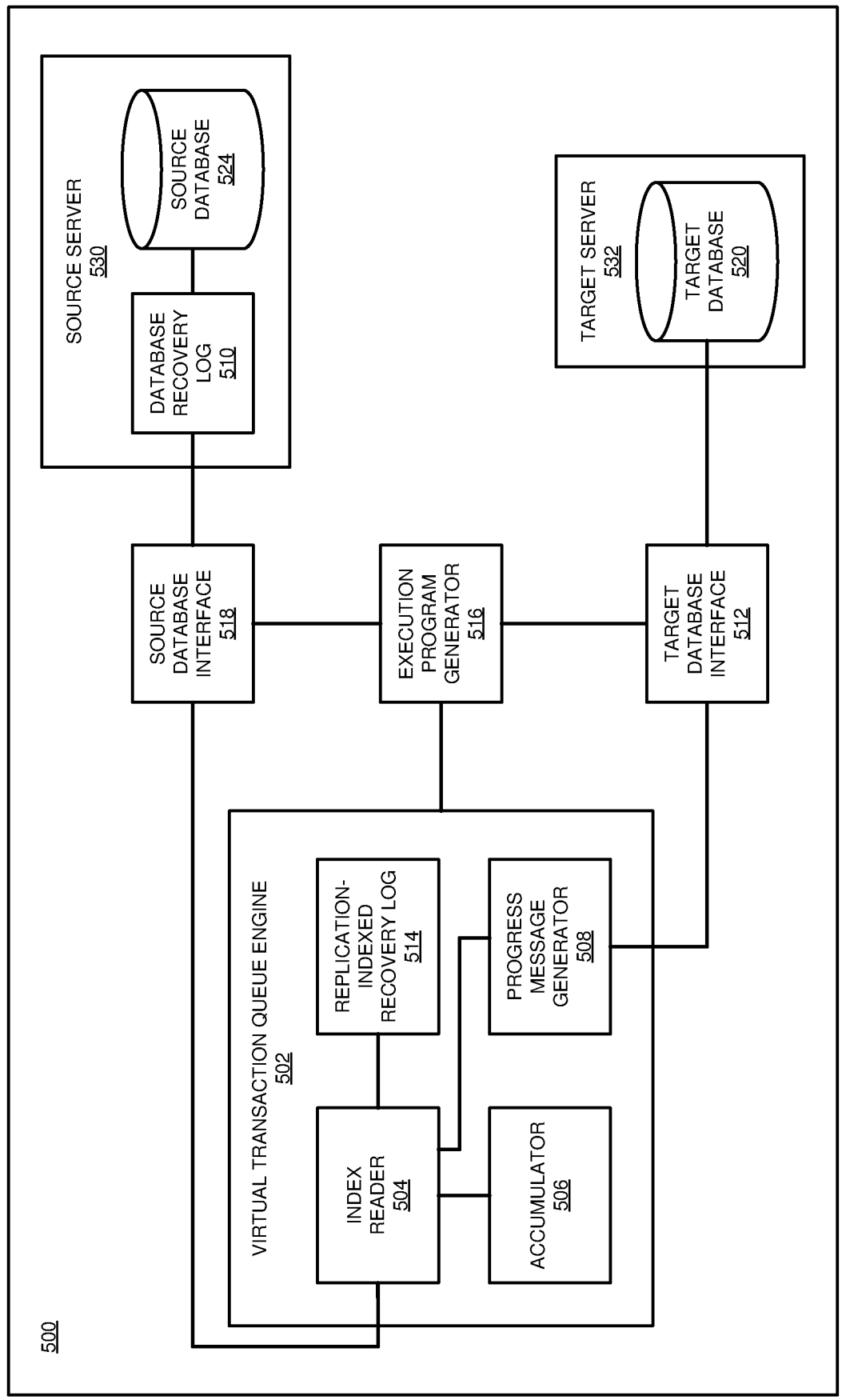
FIG. 5A depicts a block diagram of an example configuration for a virtual transaction queue engine in accordance with an illustrative embodiment.
Figure 5B:
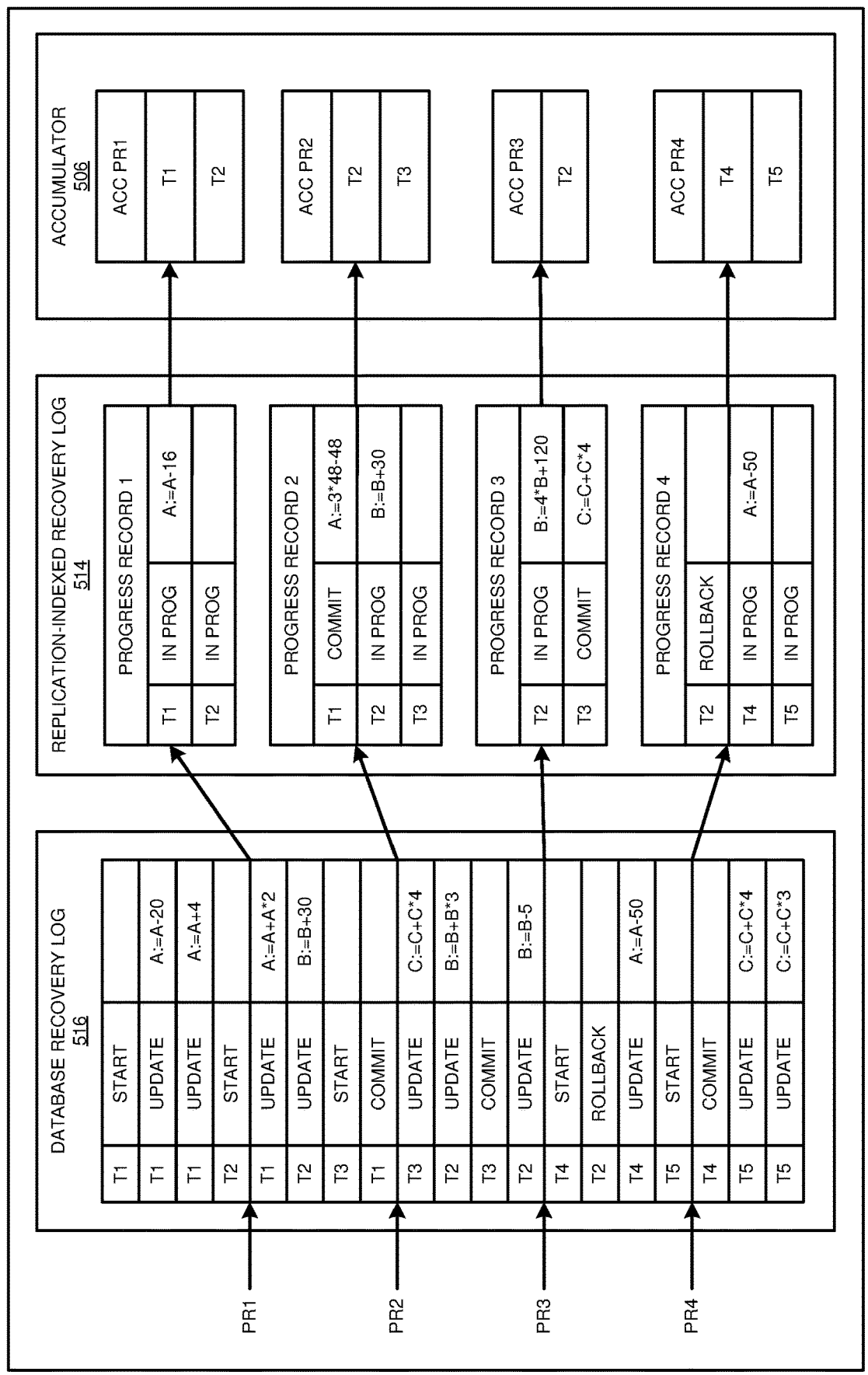
FIG. 5B depicts a simplified example of log data being indexed by the virtual transaction queue engine in accordance with an illustrative embodiment.

With reference to FIGS. 5A and 5B, FIG. 5A depicts a block diagram of an example configuration 500 for a virtual transaction queue engine 502 in accordance with an illustrative embodiment. FIG. 5B depicts a simplified example of log data being indexed by the virtual transaction queue engine 502 in accordance with an illustrative embodiment. In the illustrated embodiment, the virtual transaction queue engine 502 is an example of virtual transaction queue engine 410 in FIG. 4.

In some embodiments, the virtual transaction queue engine 502 includes an index reader 504, an accumulator 506, a progress message generator 508, and a replication-indexed recovery log 514. In alternative embodiments, the virtual transaction queue engine 502 is implemented such that some or all of the functionality described herein is grouped the same or grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, virtual transaction queue engine 502 is a component of a data replication application, such as the data replication application 402 in FIG. 4. In some embodiments, an execution program generator 516 provides logic for the virtual transaction queue engine 502 operating as a component of a data replication application. Thus, in some embodiments, the virtual transaction queue engine 502 operates under the control of the execution program generator 516 that coordinates the functions of the virtual transaction queue engine 502 with other functions of a data replication application. For example, in some embodiments, the execution program generator 516 signals the index reader 504, the accumulator 506, the progress message generator 508, and the replication-indexed recovery log 514 to initiate or perform functions described herein.

In some embodiments, the execution program generator 516 signals the index reader 504 to begin periodically reading a database recovery log 510 in response to a replication request, such as the replication request 422 of FIG. 4. In some embodiments, the recovery log 510 stores changes to the source database 524 as they occur, for example by storing the changes as a series of imperative commands. In some embodiments, the index reader 504 communicates with the database recovery log 510 via a source database interface 518, which facilitates communications between the virtual transaction queue engine 502 and the source server 530.

In some embodiments, the index reader 504 to begin periodically reading a database recovery log 510 in response to a replication request, such as the replication request 422 of FIG. 4. In some embodiments, the index reader 504 reads the database recovery log 510 at predetermined time intervals. In some embodiments, the index reader 504 reads the database recovery log 510 at time intervals that vary. In some embodiments, the index reader 504 reads the database recovery log 510 at predetermined time intervals.

In some embodiments, the index reader 504 maintains progress records in which the net effect of each operation on its transaction as read from in the database recovery log 510 is maintained in memory. In some embodiments, progress records are stored in the replication-indexed recovery log 514. In some embodiments, progress records index the change in every transaction by adding and remove individual transaction records, instead of processing the entirety of every record. Thus, in some embodiments, progress records are produced in response to the index reader 504 reading changes from the recovery log 510. In some embodiments, progress records are produced at predetermined time intervals. In other such embodiments, progress records are produced at time intervals that vary. In some embodiments, each progress record includes a net change for each transaction in progress, where the net change is the net change since the last progress record.

In some embodiments, the index reader 504 also detects transactions that have been committed, transactions that have been aborted or rolled back, and new transactions since the last progress record. In some embodiments, the index reader 504 maintains a record of new and in-progress transactions in an accumulator 506 and checks the status of these transactions during subsequent intervals. In some embodiments, the index reader 504 notifies the progress message generator 508 of transactions that have committed so that the committed transactions can be converted into messages and transmitted to the target server 532 via a target database interface 512 in order to update the target database 520.

FIG. 5B depicts simplified examples of database operations being processed by the virtual transaction queue engine 502. The simplified examples of database operations shown in FIG. 5B are non-limiting examples shown only for the sake of clarity of the description. Thus, because FIG. 5B is a simplified depiction of data being processed by the virtual transaction queue engine 502 for the sake of clarity, actual implementations of the described embodiments may include additional or alternative operations, log fields, variations in the intervals, among various possible differences from the depicted example.

In the illustrated example, at the end of a first interval (designated by PR1), the database operations logged in the database recovery log 510 from the top to PR1 are read by the index reader 504. The index reader 504 creates a progress record (PROGRESS RECORD 1) that is stored in the replication-indexed recovery log 514 and includes net changes by transactions occurring during the first illustrated interval. The index reader 504 also stores a record of transactions to continue to check after future intervals in the accumulator 506, which in the illustrated example include transactions T1 and T2 because these transactions did not abort or commit during the first illustrated interval.

The next interval is the second illustrated interval that spans from PR1 to PR2. At the end of the second interval (designated by PR2), the database operations logged in the database recovery log 510 from PR1 to PR2 are read by the index reader 504, which creates a progress record (PROGRESS RECORD 2) that is stored in the replication-indexed recovery log 514 and includes net changes by transactions occurring during the second illustrated interval. The index reader 504 also stores a record of transactions to continue to check after future intervals in the accumulator 506, which in the illustrated example include transactions T2 and T3 because these transactions did not abort or commit during the second illustrated interval.

Note that transaction T1 did commit during the second interval. As a result, the index reader 504 notifies the progress message generator 508 that T1 committed. In some embodiments, the index reader 504 also provides the net change for T1 to the progress message generator 508 for further processing by the replication application according to logic provided by the execution program generator 516, including eventual transmission to the target database 520.

The virtual transaction queue engine 502 will continue to operate as described as long as new entries continue to appear in the database recovery log 510. Note also that during the fourth illustrated embodiment, a transaction T2 is aborted by a rollback operation. In this case, the transaction T2 is removed from the accumulator 506 and no further processing is performed with the data associated with transaction T2.

Figure 6A:
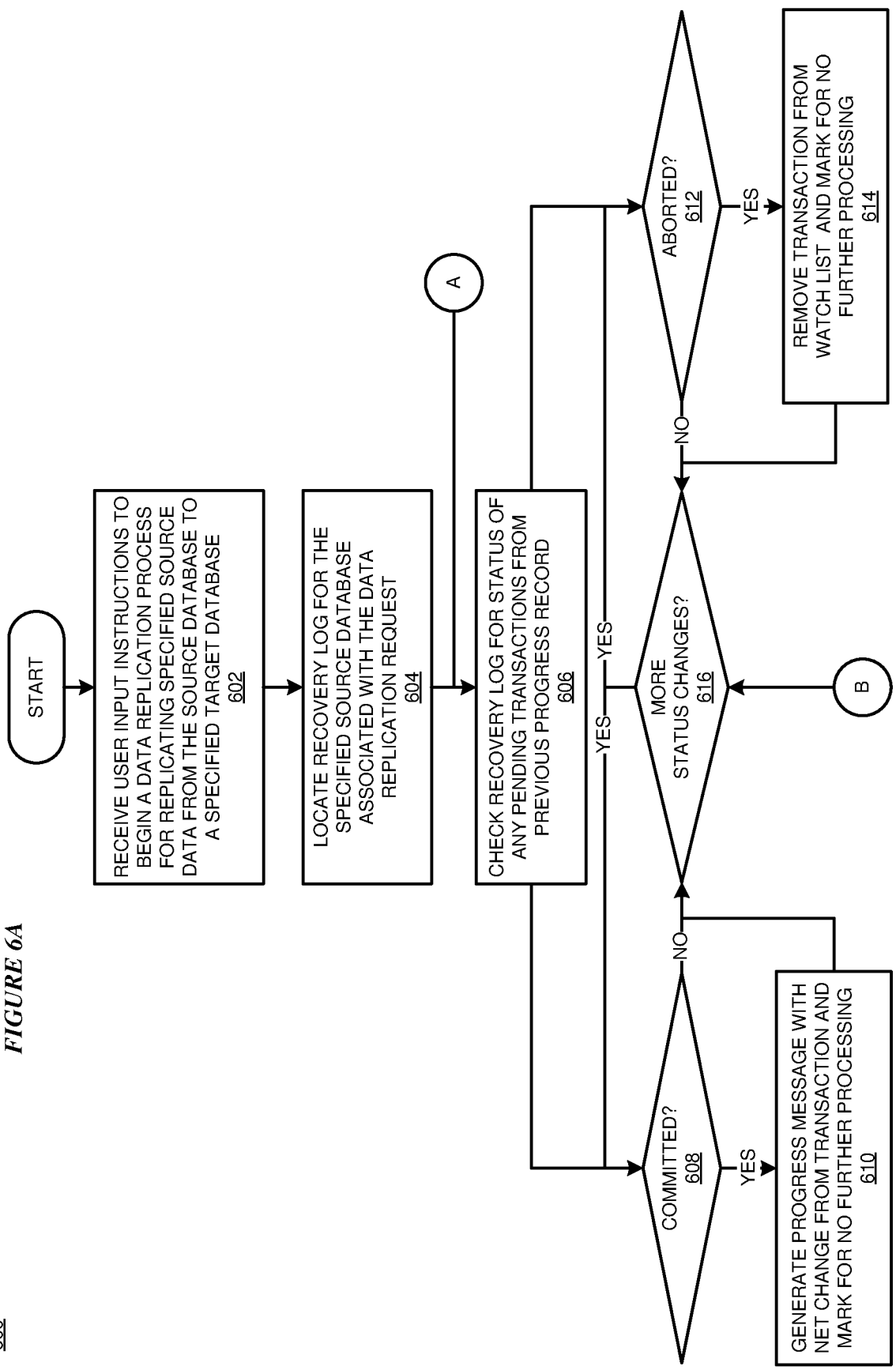
FIG. 6A depicts a first portion of a flowchart of an example data replication process utilizing a virtual transaction queue in accordance with an illustrative embodiment.
Figure 6B:
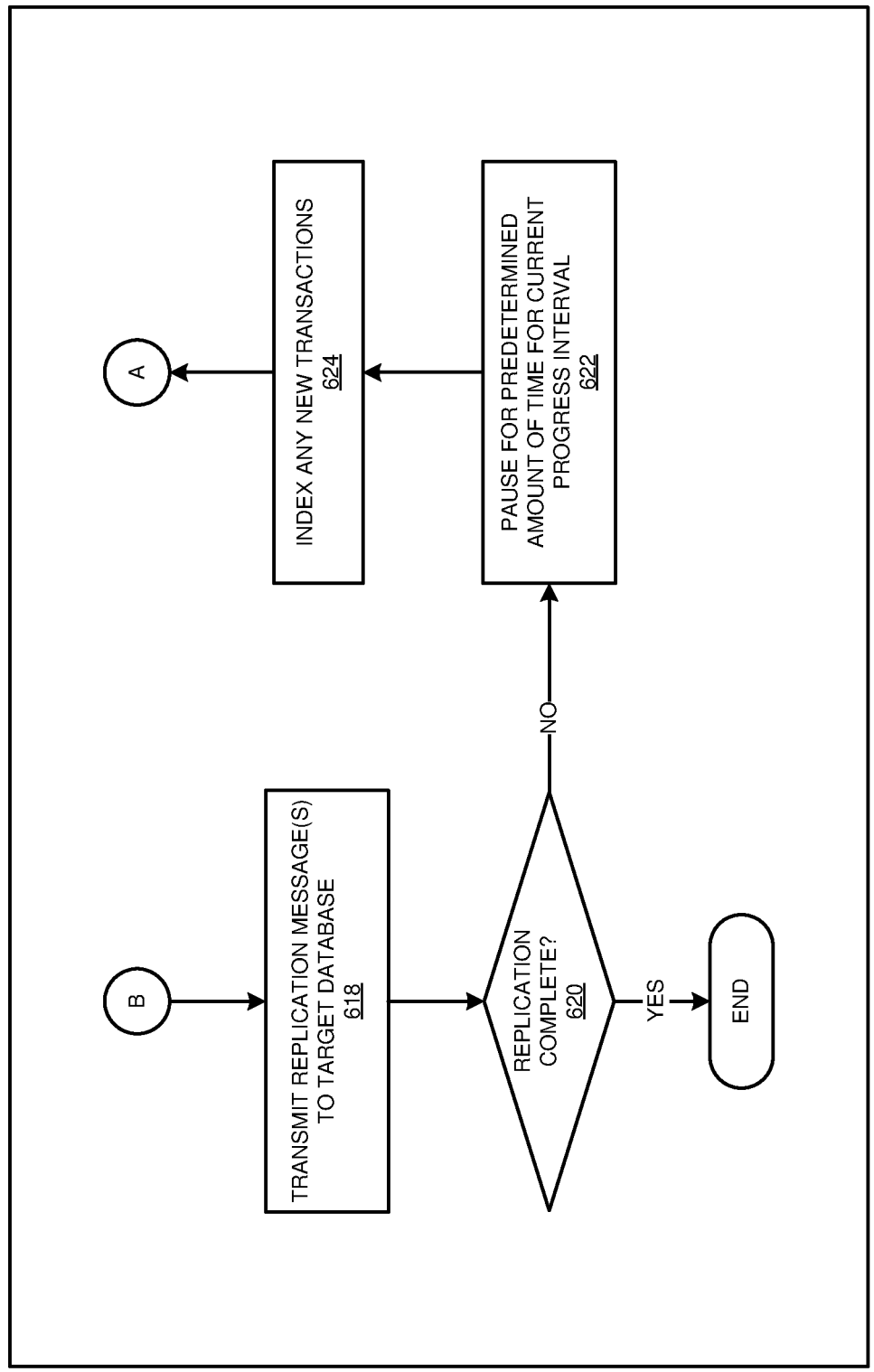
FIG. 6B depicts a second portion of the flowchart shown in FIG. 6A of an example data replication process utilizing a virtual transaction queue in accordance with an illustrative embodiment.

With reference to FIG. 6, this figure depicts a flowchart of an example data replication process 600. In a particular embodiment, the data replication application 402 of FIG. 4 and the virtual transaction queue engine 502 of FIGS. 5A and 5B carry out the process 600.

In an embodiment, at block 602, the data replication application receives user input instructions to begin a data replication process for replicating specified source data from the source database to a specified target database. The data replication application then locates the recovery log for the specified source database associated with the data replication request at block 604, and begins periodically checking the recovery log for the status of any pending transactions from previous progress records that had not yet committed or aborted.

For each transaction, if the transaction committed as indicated at block 608, the process continues to block 610 where the application generates a progress messages with the net change from the committed transaction and marks the transaction for no further processing, for example by removing it from the accumulator. On the other hand, if the transaction aborted as indicated at block 612, the process continues to block 614 where the application simply removes the transaction from the watch list, such as the list in the accumulator, and/or otherwise marks the transaction for no further processing.

After block 610 or 614, the process checks for further status changes (commits or aborts) and processes each such transaction as described in connection with blocks 608, 620, 612, and 614. Otherwise, the process continues to block 618 where progress messages for committed transactions are transmitted to the target database, albeit in some embodiments that the application may perform additional processing on the data, such as translations or transformations, prior to transmission to the target database.

Next, at block 620, if replication is complete, the process ends. Otherwise, at block 622, the process pauses for a predetermined amount of time for the current progress interval. Once the time interval has passed, at block 624 the index reader indexes any new transactions that started during the pause at block 622, then returns to block 606 to repeat the described process for additional intervals until replication is over.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer-implemented method, system or apparatus, and computer program product are provided in the illustrative embodiments for managing participation in online communities and other related features, functions, or operations. Where an embodiment or a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   extracting, after a first specified time interval, recovery data from a recovery log for a data table corresponding to a set of database operations on the data table that occurred during the first specified time interval;
   generating, responsive to extracting the recovery data at the end of the first specified time interval, index data for a progress record associated with the first time interval, wherein the progress record includes a first data field for storing data representative of a first net change to the data table resulting from a first subset of the set of database operations, wherein the first subset of database operations are associated with a first transaction;
   detecting, responsive to generating the index data, a commit operation in the first subset of database operations that committed the first transaction; and
   recovering, responsive to detecting the commit operation, the first transaction in a target data table using the recovery log and the first net change data associated with the first transaction in the progress record.

2. The computer-implemented method of claim 1, further comprising:
   generating, responsive to extracting the recovery data at the end of the first specified time interval, additional index data for the progress record associated with the first time interval, wherein the progress record includes a second data field for storing data representative of a second net change to the data table resulting from a second subset of the set of database operations, wherein the second subset of database operations are associated with a second transaction.

3. The computer-implemented method of claim 2, further comprising:
   detecting, responsive to generating the additional index data, that the second subset of database operations lack a terminating operation on the second transaction during the first specified time interval.

4. The computer-implemented method of claim 3, further comprising:
   generating, responsive to detecting the lack of a terminating operation, an accumulator data entry representative of the second transaction, wherein the accumulator data entry provides an indication of transactions to check for changes after a second specified time interval subsequent to the first specified time interval.

5. The computer-implemented method of claim 2, further comprising:
   detecting, responsive to generating the additional index data, a rollback operation in the second subset of database operations that aborted the second transaction.

6. The computer-implemented method of claim 5, further comprising:
   removing, responsive to detecting the rollback operation, the second transaction from future processing by removing an accumulator data entry associated with the second transaction.

7. The computer-implemented method of claim 2, further comprising:
   detecting, responsive to generating the additional index data, a start operation in the second subset of database operations that started the second transaction during the first specified time interval.

8. The computer-implemented method of claim 7, further comprising:
   further detecting, responsive to generating the additional index data, that the second subset of database operations lack a terminating operation on the second transaction during the first specified time interval; and
   generating, responsive to detecting the lack of a terminating operation, an accumulator data entry representative of the second transaction, wherein the accumulator data entry provides an indication of transactions to check for changes after a second specified time interval subsequent to the first specified time interval.

9. The computer-implemented method of claim 7, further comprising:
   detecting, responsive to generating the additional index data, a second commit operation in the second subset of database operations that committed the second transaction during the first specified time interval; and
   recovering, responsive to detecting the second commit operation, the second transaction in the target data table using the recovery log and the second net change data associated with the second transaction in the progress record.

10. The computer-implemented method of claim 7, further comprising:
    detecting, responsive to generating the additional index data, a rollback operation in the second subset of database operations that aborted the second transaction during the first specified time interval; and
    removing, responsive to detecting the rollback operation, the second transaction from future processing by removing an accumulator data entry associated with the second transaction.

11. A computer usable program product for data replication, the computer program product comprising one or more computer readable storage media, and program instructions collectively stored on the one or more computer readable storage media, the program instructions executable by a processor to cause the processor to perform operations comprising:
    extracting, at the end of a first specified time interval, recovery data from a recovery log for a data table corresponding to a set of database operations on the data table that occurred during the first specified time interval;
    generating, responsive to extracting the recovery data at the end of the first specified time interval, index data for a progress record associated with the first time interval, wherein the progress record includes a first data field for storing data representative of a first net change to the data table resulting from a first subset of the set of database operations, wherein the first subset of database operations are associated with a first transaction;

detecting, responsive to generating the index data, a commit operation in the first subset of database operations that committed the first transaction; and recovering, responsive to detecting the commit operation, the first transaction in a target data table using the recovery log and the first net change data associated with the first transaction in the progress record.

12. The computer usable program product of claim 11, wherein the stored program instructions are stored in a computer readable storage device in a data processing system, and wherein the stored program instructions are transferred over a network from a remote data processing system.

13. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

14. The computer usable program product of claim 11, further comprising:

generating, responsive to extracting the recovery data at the end of the first specified time interval, additional index data for the progress record associated with the first time interval, wherein the progress record includes a second data field for storing data representative of a second net change to the data table resulting from a second subset of the set of database operations, wherein the second subset of database operations are associated with a second transaction.

15. The computer usable program product of claim 14, further comprising:

detecting, responsive to generating the additional index data, that the second subset of database operations lack a terminating operation on the second transaction during the first specified time interval.

16. The computer usable program product of claim 15, further comprising:

generating, responsive to detecting the lack of a terminating operation, an accumulator data entry representative of the second transaction, wherein the accumulator data entry provides an indication of transactions to check for changes after a second specified time interval subsequent to the first specified time interval.

17. A computer system comprising a processor and one or more computer readable storage media, and program instructions collectively stored on the one or more computer readable storage media, the program instructions executable by the processor to cause the processor to perform operations comprising:

extracting, at the end of a first specified time interval, recovery data from a recovery log for a data table corresponding to a set of database operations on the data table that occurred during the first specified time interval;

generating, responsive to extracting the recovery data at the end of the first specified time interval, index data for a progress record associated with the first time interval, wherein the progress record includes a first data field for storing data representative of a first net change to the data table resulting from a first subset of the set of database operations, wherein the first subset of database operations are associated with a first transaction;

detecting, responsive to generating the index data, a commit operation in the first subset of database operations that committed the first transaction; and recovering, responsive to detecting the commit operation, the first transaction in a target data table using the recovery log and the first net change data associated with the first transaction in the progress record.

18. The computer system of claim 17, further comprising:

generating, responsive to extracting the recovery data at the end of the first specified time interval, additional index data for the progress record associated with the first time interval, wherein the progress record includes a second data field for storing data representative of a second net change to the data table resulting from a second subset of the set of database operations, wherein the second subset of database operations are associated with a second transaction.

19. The computer system of claim 18, further comprising:

detecting, responsive to generating the additional index data, that the second subset of database operations lack a terminating operation on the second transaction during the first specified time interval.

20. The computer system of claim 19, further comprising:

generating, responsive to detecting the lack of a terminating operation, an accumulator data entry representative of the second transaction, wherein the accumulator data entry provides an indication of transactions to check for changes after a second specified time interval subsequent to the first specified time interval.

* * * * *